Oct. 17, 1961  G. H. GOODEMOTE ET AL  3,004,305
RESILIENT SASH MOUNTING FOR VEHICLES
Filed Feb. 20, 1959
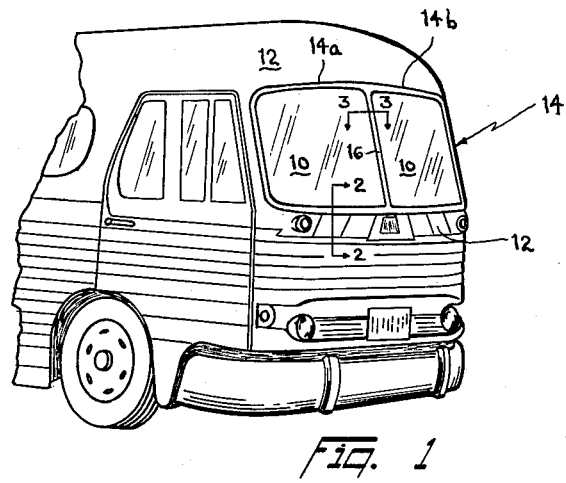
Fig. 1
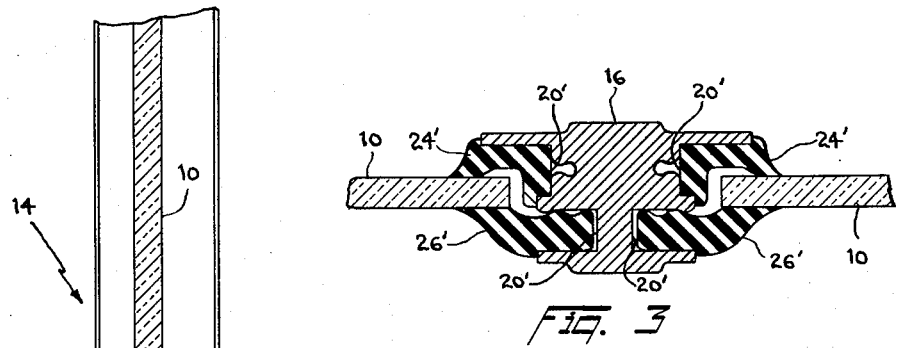
Fig. 3
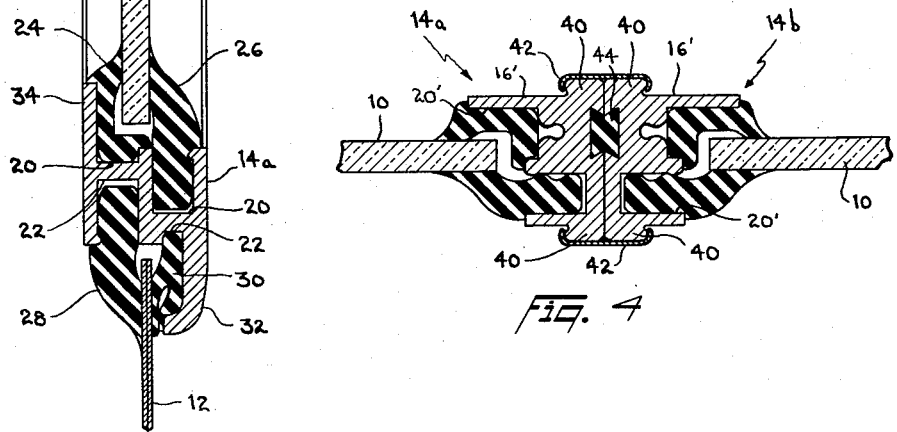
Fig. 2
Fig. 4
INVENTORS
GEORGE H. GOODEMOTE
BY  DANIEL E. AXE
Richard von K. Bruns
Attorney

United States Patent Office

3,004,305
Patented Oct. 17, 1961

3,004,305
RESILIENT SASH MOUNTING FOR VEHICLES
George H. Goodemote, Syracuse, and Daniel E. Axe, Fayetteville, N.Y., assignors to The O. M. Edwards Company, Inc., Syracuse, N.Y., a corporation of New York
Filed Feb. 20, 1959, Ser. No. 794,566
2 Claims. (Cl. 20—56.4)

This invention relates generally to window constructions for automotive vehicles, and has special reference to an improved mounting arrangement for resiliently supporting sheet glass in a vehicle body or window opening in such a manner that the possibility of glass breakage is reduced to a minimum. While the invention is particularly directed to alleviating the problem of breakage in curved glass panels, the improved mounting means thereof also provides a more flexible support for any kind of fixed panel as will be apparent from the detailed description to follow.

In modern busses, trucks and passenger cars, the large windshield panels are usually curved, and often the glass panels at the rear of the vehicle are curved also. It has been found that these curved panels have a greater tendency to break than ordinary flat panels, and this is due to the built in strains that are present in curved glass and also to the fact that it is more difficult to hold curved glass panels to close tolerances. As a result of the latter, there may be significant variations in the panels provided for a particular vehicle body opening, and this coupled with the variations that always occur in the body openings themselves frequently result in a poor fit and still greater strains on the glass.

At the present time, the usual practice is to secure each such panel in its window opening by means of a single rubber gasket having oppositely facing channels, one of which receives the edge of the glass panel and the other of which receives the edges of the vehicle body panels surrounding the window opening. Unfortunately, both ageing and cold weather cause rubber to get hard and lose its resiliency, and when this happens weaving and distortion of the vehicle body due to rough driving conditions are transmitted through the rubber to the already strained glass panel and breakage occurs. Since curved glass panels in particular are expensive and it is time consuming to replace same, this breakage creates a real problem to the transportation industry.

In the present invention, a rigid frame is positioned between the glass and vehicle body panels, and is resiliently connected to both. This arrangement provides what might be called a "double floating" action since the glass panel is flexibly mounted with respect to the frame and the frame in turn is flexibly mounted with respect to the body panels. With such an arrangement, even though the resilient mounting material is rubber, and even though the rubber may lose some of its resiliency, distortions in the vehicle body cannot be transmitted directly to the glass because of the rigid intermediate frame. Moreover, separating the glass panel from the body panels by two independent resilient connections makes the possibility of transmitting body stresses to the glass even more remote so that the breakage for this reason is substantially eliminated. In addition, the mounting means of the invention is designed so that one of the resilient connections thereof compensates for any variations there might be in the glass panel while the other resilient connection compensates for variations in the size of the window opening.

With the foregoing and other considerations in view, therefore, it may be stated that the broad objective of the present invention is to provide a mounting arrangement for glass panels in vehicles which greatly reduces the possibility of glass breakage due to the weaving and distortion that occur in a vehicle body when it is being driven.

Another important object of the invention is to provide an improved mounting means for vehicular glass panels which is sufficiently flexible to compensate for and adjust to minor variations in both the glass panels and the vehicle window openings.

A further important object of the invention is to provide an improved mounting means for vehicular glass panels wherein the resilient mounting connections also serve as an effective weather seal.

Still another important object of the invention is to provide an improved mounting means for vehicular glass panels which is of relatively simple construction and is easy to assemble and install.

A more specific object of the invention is to provide an improved means for mounting a glass panel in a vehicle window opening bordered by body panels wherein a rigid frame is positioned between the glass and body panels and is resiliently connected to both.

Another specific object of the invention is to provide an improved means for mounting a glass panel in a vehicle window opening bordered by body panels wherein the glass is separated from the panels by two independent resilient connections.

Other objects and advantages of the invention will become apparent from the following detailed description thereof read in conjunction with the accompanying drawings which illustrate a representative embodiment of the invention as applied to a bus for the purpose of disclosure.

In the drawings:
FIGURE 1 is a fragmentary three-quarter view of the bus having curved windshield panels which are secured in position by the mounting means of the invention;
FIGURE 2 is an enlarged vertical section through a portion of the mounting means taken substantially along line 2—2 of FIGURE 1;
FIGURE 3 is an enlarged horizontal section through the center mullion taken substantially along line 3—3 of FIGURE 1; and
FIGURE 4 is a horizontal sectional view corresponding to FIGURE 3 showing a modified center mullion arrangement.

Having reference now to the drawings, wherein like reference numbers designate the same part in each of the views, 10 indicates the windshield panels which are of curved sheet glass and are mounted in a window opening bordered by the body panels 12 of the bus. In accordance with the invention, a rigid frame that is generally indicated at 14 is positioned between the glass and body panels, the parts being resiliently connected together by retaining means to be presently described. In the illustrated embodiment, where the windshield comprises a pair of panels, the frame is constructed in two U-shaped sections 14a and 14b, and the open inner sides of these two sections are rigidly connected to a common center mullion 16 indicated in FIGURE 3. The frame as a whole, therefore, has the effect of being continuous with respect to its intermediate position between the glass panels and bus body.

The top, bottom and outer side rails of each frame section are formed as shown in FIGURE 2 with a pair of parallel, inwardly facing channels 20 at the inside edge thereof and a pair of parallel, outwardly facing channels 22 at the outside edge thereof. The channels 20 are of unequal depth and receive a pair of retaining strips 24, 26 of some compressible resilient material such as rubber which engage the opposite side edges of the glass panel to resiliently support same in the frame. Similarly, the channels 22 are of unequal depth and receive a pair of compressible resilient retaining strips 28, 30 which engage the marginal edges of the body panels bordering the window opening to resiliently secure the frame in position therein.

As will be apparent from FIGURE 2, the retaining strips 24, 26 hold the glass out of physical contact with, or in spaced relation to, the frame 14, while the strips 28, 30 hold the frame out of physical contact with the body panels 12. The arrangement described thus makes ample provision for minor size variations in the glass panel and window opening and, what is even more important, provides a double floating action because the glass panel is flexibly mounted with respect to the frame and the frame in turn is flexibly mounted with respect to the vehicle body. With such an arrangement, even if the retaining strips lose some of their resiliency, distortions occurring in the vehicle body as it is being driven cannot be transmitted directly to the glass because of the rigid intermediate frame. Moreover, separating the glass panels from the body panels by two independent nonrigid connections, i.e., the retaining strips 24, 26, and 28, 30, makes the possibility of transmitting body stresses to the glass remote under any conditions so that glass breakage for this reason is substantially eliminated.

Still referring to FIGURE 2, it will be seen that when the sash assembly is mounted in the window opening a portion of the frame 14 overlaps the marginal edges of the body panels on the exterior of the vehicle, the overlapping portion 32 being an outward extension or projection of the outer wall of the outside channel 22. Similarly, another portion 34 of the frame overlaps the marginal edges of the glass panel 10 on the interior of the vehicle, the portion 34 being an inward extension of the outer wall of the inside channel 20. The reason for this construction is so that any external pressure on the sash assembly caused by the forward motion of the vehicle will force the glass into closer, tighter relation to the frame by compressing the retaining strip 24 and will force the frame into closer, tighter relation to the body panels by compressing the retaining strip 30. In this manner, the glass is not only securely held in the window opening under all driving conditions, but a highly effective weather seal is provided. In addition to its above described function, the exterior overlapping portion 32 also serves to substantially conceal the retaining strip 30 from view and protect same against deterioration due to sun and weather.

The top, bottom and outer side rails forming three sides of each U-shaped frame section 14a and 14b are usually integrally connected to one another and, in assembling the frame, retaining strips 24, 26 and glass panels 10 are inserted into the frame sections and then the free ends of the top and bottom rails thereof are rigidly connected to the center mullion 16 to complete the enclosure. Like the other rails of the frame sections, the center mullion 16 is formed with inwardly facing channels 20' and retaining strips 24', 26' are positioned in these channels for engagement with the glass, see FIGURE 3.

FIGURE 4 illustrates a modified center mullion arrangement wherein the U-shaped frame sections 14a and 14b are provided with inner side rails 16' which are rigidly secured together to form the center mullion of the windshield. To this end, the rails 16' are formed with edge projections 40 that are clamped together by metal retaining strips 42, weatherstripping 44 being positioned in aligned grooves in the rails to provide a weather seal therebetween. In the alternative, the inner side rails 16' can be secured together by any conventional fastening means such as screws (not shown). In passenger cars and for applications such as rear windows, the center mullion may, of course, be eliminated altogether and a single, continuous frame arrangement employed.

From the foregoing description, it will be clear that the invention provides a novel and highly practical resilient mounting means for vehicular glass panels whereby glass breakage due to vehicle body distortions and glass and window opening variations is substantially eliminated. As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. A sash assembly for a vehicle window opening bordered by vehicle body panels comprising a continuous, rigid frame having inside and outside edges and an interior and exterior side, said frame being formed with a pair of inwardly facing and a pair of outwardly facing channels at the inside and outside edges respectively of the frame, sheet glass, a first pair of resilient compressible retaining strips respectively mounted in the pair of channels at the inside edge of said frame to support said glass therein and provide a weather seal between the glass and frame, said pair of retaining strips holding said glass in spaced relation to said frame whereby the glass is resiliently supported therein, and a second pair of resilient compressible retaining strips respectively mounted in the pair of channels at the outside edge of said frame and engaging the marginal edges of the body panels bordering said window opening to support the frame therein and provide a weather seal between the frame and panels, said second pair of retaining strips holding said frame in spaced relation to said panels whereby the frame is substantially resiliently supported in the window opening, said frame including a portion on its exterior side which overlaps the marginal edges of the body panels on the exterior of the vehicle when the frame is mounted in said window opening, one of said second pair of retaining strips being positioned between said overlapping frame portion and the body panels and normally holding the portion in spaced relation to the panels whereby external pressure on said sash assembly forces the overlapping portion into closer, tighter relation with the panels by compressing said retaining strip, said frame also including a portion on its interior side which overlaps the marginal edges of said sheet glass on the interior of said vehicle, one of said first pair of retaining strips being positioned between said glass and overlapping frame portion and normally holding the glass in spaced relation to the portion whereby external pressure on said sash assembly forces the glass into tighter, closer relation with the overlapping portion by compressing said retaining strip.

2. In a mounting means for supporting a glass panel in a vehicle window opening bordered by vehicle body panels: a continuous, rigid frame having inside and outside edges and an interior and exterior side, said frame having a first pair of parallel, continuous channels of unequal depth formed in the inside edge thereof, said parallel channels having a common inside wall, the outside wall of one of said channels projecting inwardly into the frame beyond the common inside wall and the outside wall of the other channel, said frame also having a second pair of parallel, continuous channels of unequal depth formed in the outside edge thereof, said second pair of parallel channels having a common inside wall coextensive with the common inside wall of said first pair of channels, the outside wall of one of said second pair of channels projecting outwardly from the frame beyond the common inside wall and the outside wall of the other channel, said outwardly projecting channel wall being on the exterior side of the frame and said inwardly projecting channel wall being on the interior side of the frame.

(References on following page)

References Cited in the file of this patent

UNITED STATES PATENTS

| | | |
|---|---|---|
| 2,280,389 | Edwards | Apr. 21, 1942 |
| 2,550,300 | Schunk | Apr. 24, 1951 |

FOREIGN PATENTS

| | | |
|---|---|---|
| 282,961 | Switzerland | Sept. 1, 1952 |
| 91,913 | Norway | Apr. 26, 1958 |